United States Patent [19]

Kiczek et al.

[11] Patent Number: 5,034,171
[45] Date of Patent: Jul. 23, 1991

[54] PROCESS FOR EXTRUDING THERMOPLASTIC MATERIALS USING LOW PRESSURE INERT GASES AS FOAMING AGENTS

[75] Inventors: Edward F. Kiczek, Long Valley, N.J.; Augustine I. Dalton, Jr., Trexlertown, Pa.

[73] Assignee: Air Products and Chemicals, Inc., Allentown, Pa.

[21] Appl. No.: 443,777

[22] Filed: Nov. 30, 1989

[51] Int. Cl.$^5$ ............................................. B29C 67/22
[52] U.S. Cl. .................................. 264/51; 264/211.23
[58] Field of Search ...................... 264/211.21, 211.22, 264/211.23, 41, 51

[56] References Cited

U.S. PATENT DOCUMENTS

| | | | |
|---|---|---|---|
| 3,444,283 | 5/1969 | Carlson, Jr. ..................... | 264/211.23 |
| 3,806,569 | 4/1974 | Gallard et al. .................. | 264/211.23 |
| 3,814,779 | 6/1974 | Wiley .............................. | 264/211.23 |
| 3,843,757 | 10/1974 | Ehrenfreund et al. ........ | 264/211.23 |
| 4,185,060 | 1/1980 | Ladney, Jr. .................... | 264/211.23 |
| 4,390,332 | 6/1983 | Hendry .............................. | 425/4 R |
| 4,393,017 | 7/1983 | Kim et al. ...................... | 264/211.21 |
| 4,409,164 | 10/1983 | Brasz et al. .................... | 264/211.21 |
| 4,409,165 | 10/1983 | Kim ................................ | 264/211.23 |
| 4,473,665 | 9/1984 | Martini-Vvedensky et al. .... | 521/79 |
| 4,913,864 | 4/1990 | Soga et al. ..................... | 264/211.23 |

Primary Examiner—Hubert C. Lorin
Attorney, Agent, or Firm—Keith D. Gourley; James C. Simmons; William F. Marsh

[57] ABSTRACT

A process for producing microcellular foamed articles wherein a low pressure compressible, inert gas such as nitrogen is used as a foaming agent. The process comprises introducing a thermoplastic material into an inlet of an extruder having a length to diameter ratio of at least 30:1, said extruder comprising a screw having at least one stage; heating the thermoplastic material in a melt zone to a temperature sufficient to melt or soften the thermoplastic material to form a melted thermoplastic material; injecting an insoluble compressible, inert gas into the melted thermoplastic material at a position approximately 1 to 2 screw diameters downstream of the melt zone; mixing the molten thermoplastic material and the inert, compressible gas to form a homogeneous dispersion of insoluble bubbles within the material; reducing the pressure of the molten thermoplastic material causing the homogeneously dispersed bubbles to expand within the melted thermoplastic material to form a foamed article and cooling the foamed article to a temperature below the melting or softening point of the foamed article.

19 Claims, 1 Drawing Sheet

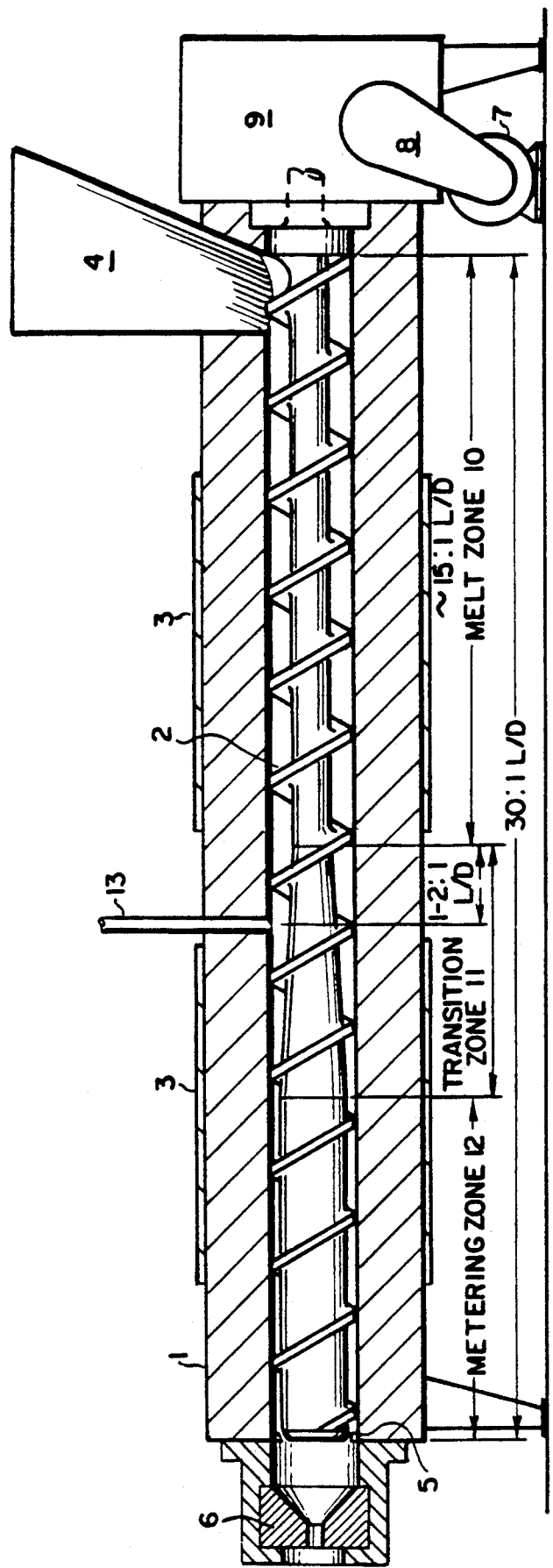

PROCESS FOR EXTRUDING THERMOPLASTIC MATERIALS USING LOW PRESSURE INERT GASES AS FOAMING AGENTS

TECHNICAL FIELD OF THE INVENTION

The present invention relates to a process for producing microcellular foamed articles wherein low pressure inert gases are utilized as foaming agents to expand thermoplastic materials.

BACKGROUND OF THE INVENTION

Foamed thermoplastic materials are used in many applications including, but not limited to cushioning and packaging materials. insulation, foamed extruded profiles and injection molded structural foam. Foamed thermoplastic materials offer numerous advantages over other structural materials including thermal and sound insulation, reduced weight per unit volume and low cost per unit volume.

Various methods are known for producing cellular thermoplastic articles which are generally referred to as "foam" or "foamed thermoplastic" articles. Foaming is typically accomplished by injecting an inert gas such as nitrogen or carbon dioxide under pressures ranging from about 8,000 to 15,000 psig into a molten polymer followed by a release of pressure to expand the thermoplastic material to form a foamed article. Addition of volatile liquids such as chlorofluorocarbons and pentane are commonly employed to foam specific polymers including polystyrene and various polyurethanes. Another group of blowing agents, typically referred to as chemical blowing agents, decompose upon heating to generate gas which is utilized to expand the polymer. Chemical blowing agents are commonly employed in the extrusion of profiles and foam injection molding of automotive parts. Chemical blowing agents utilized for foaming polymers include both inorganic materials ( e.g., sodium bicarbonate and sodium borohydride) and organic materials (e.g., azodicarbonamide, tetrazoles and semi-carbazides) . Azodicarbonamide, which decomposes in the range of 400° to 450° C., is a commonly used chemical blowing agent which generates nitrogen and carbon monoxide upon decomposition. P-toluenesulfonyl semi-carbazide and 5-phenyltetrazole, having decomposition temperature ranging from 440°–450° F. and 460° -500° F., respectively, are utilized in the foaming of higher temperature engineering polymers. Variants of 5-phenyltetrazole are noted to be useful as foaming agents in processes wherein processing temperatures approach 750° F.

In the foaming of molten thermoplastic resins, volatilizable blowing agents form bubbles around nuclei within the molten polymer resin. While a certain number of nuclei are inherently present within the molten polymer, additional nucleating agents may by added to facilitate the production of fine-celled foams. Examples of materials employed as nucleating agents include surfactants, dissolved inert gases, gas-liberating thermally decomposable solids. non-decomposable inorganic solids and materials which provide hot spots such as below melting metals.

In the production of cellular thermoplastic articles wherein a molten thermoplastic resin is expanded utilizing a dissolved, soluble volatilizable blowing agent, bubble formation takes place in the melt as the pressure on the melt is reduced. Typically, such a pressure drop takes place as the dissolved foaming agent within the melt, residing at a higher temperature and pressure, passes through a die or orifice to the outside of the die or orifice which typically resides at ambient pressure and temperature. The dissolved foaming agent surrounding the bubble diffuses into the bubble as a bubble is initiated at a nucleating site. Bubble formation is facilitated by the presence of an effective amount of nucleation sites. If such sites are present, bubbles will be formed when the driving force is relatively low whereas high driving forces are required when nucleation sites are relatively few in number.

The prior art teaches various processes for forming thermoplastic articles wherein highly pressurized nitrogen is utilized as a foaming agent. Such processes typically are modelled after conventional systems known in the art which employ chlorofluorocarbons as foaming agents. More particularly, nitrogen, which is insoluble in typical thermoplastic materials at ambient pressure, is introduced at pressures ranging from about 8,000 to 15.000 psig into an extruder at a location immediately upstream of the die or orifice. Utilization of such high pressures renders the nitrogen gas soluble in the thermoplastic material. For example, U.S. Pat. No. 4,390,332 discloses an apparatus for the injection molding of parts from foamed thermoplastic materials wherein an inert gas is injected into the melt zone of the screw and barrel assembly under high pressure and the gas bubbles which are soluble in the polymer melt at the elevated pressure are mixed with the molten plastic material as a result of the rotation of the screw within the barrel member to form the foamed plastic material. The Specification ( col. 4, line 68) states that the gas is introduced under high pressure.

U.S. Pat. No. 4,473.665 discloses a method for preparing microcellular foamed materials wherein the material to be processed is presaturated with a uniform concentration of an inert gas while controlling temperature and pressure to avoid cell nucleation. Processing is also done under pressure to avoid nucleation. After processing, pressure is released and cell nucleation occurs at or near the glass transition temperature of the material. The Specification ( col. 2, lines 43–54) states that the introduction of inert gas into the barrel of an extruder provides an unsatisfactory product because it is very difficult to measure the quantity of gas introduced into the process and the mixing stage of conventional extruders is not capable of dispersing and collapsing the large pockets of nitrogen gas within the polymer melt.

Those skilled in the art of foaming thermoplastic polymers with chlorofluorocarbons have been searching for alternative foaming agents which are inexpensive, non-hazardous to the environment and which can be used with minimum modification to the equipment presently used for foaming polymers using chlorofluorocarbons as a foaming agents. Unfortunately, previous attempts have not been entirely successful because such processes typically require complex equipment and are operated under very high pressures, typically approaching 15,000 psig, in order to supersaturate the polymer to be foamed with the foaming agent which is essentially insoluble at ambient pressure. The present invention overcomes the limitations stated in U.S. Pat. No. 4,473,665 and provides a process for foaming thermoplastic materials at substantially lower pressures with minimum equipment modifications.

BRIEF SUMMARY OF THE INVENTION

The present invention relates to a process for producing microcellular foamed articles wherein a low pressure compressible, inert gas such as nitrogen is used as a foaming agent. The process comprises introducing a thermoplastic material into an inlet of an extruder having a length to diameter ratio of at least 30:1, said extruder comprising a screw having at least one stage; heating the thermoplastic material in a melt zone to a temperature sufficient to melt or soften the thermoplastic material to form a melted thermoplastic material; injecting an insoluble compressible, inert gas into the melted thermoplastic material at a position approximately 1 to 2 screw diameters downstream of the melt zone; mixing the molten thermoplastic material and the inert, compressible gas to form a homogeneous dispersion of insoluble bubbles within the material; reducing the pressure of the molten thermoplastic material causing the homogeneously dispersed bubbles to expand within the melted thermoplastic material to form a foamed article and cooling the foamed article to a temperature below the melting or softening point of the foamed article.

Suitable inert gases for practicing the present invention include elements of Group 0 of the Periodic Classification of the Chemical Elements according to Mendeleeff as well as nitrogen, argon, xenon, krypton helium and carbon dioxide.

Thermoplastic materials capable of being foamed according to the present process include both amorphous and semi-crystalline polymers including, but not limited to products formed by the polymerization of ethylene, propylene, 1-butene, 3-methyl-1-butene, 4-methyl-1-butene, and 4-methyl-1-hexene. Moreover, polymers and copolymers of vinylaromatics such as styrene and alpha-methylstyrene. including copolymers comprising non-aromatic monomers such as ABS ( a terpolymer of styrene, acrylonitrile and butadiene) and SAN (a copolymer of styrene and acrylonitrile); acrylates such as methyl methacrylate, polyvinyl chloride and its modifications such as with polyvinyl acetate; polyvinylidene chloride and a variety of other polymers such as nylons. polycarbonates, polyesters. polyethers, cellulose derivatives and mixtures of such polymers with each other can be utilized.

Various additives, coloring agents, lubricants and the like may be added to the thermoplastic material prior to foaming. For example, nucleating agents and surfactants can be added to the polymer prior to processing. Suitable nucleating agents include inorganic fillers such as talc, wollastonite, attapulgus clay, kaolin clay, calcium carbonate and the like as well as organic substances such as citric acid. Preferred nucleating agents include Teflon powder and zeolite powders including zeolite 4A powder.

BRIEF DESCRIPTION OF THE DRAWING

The single Figure is a schematic diagram of a single stage extruder suitable for practicing the process described in the claimed invention.

DETAILED DESCRIPTION OF THE INVENTION

The present invention relates to a process for extruding microcellular foamed articles wherein a compressible, inert gas is utilized as a foaming agent to expand a thermoplastic material. The present invention represents an advance in the art because the process enables insoluble, compressible inert gases under relatively low pressure to be used as foaming agents wherein the inert gas is introduced directly into the barrel of the extruder thereby obviating the need for complex equipment and high pressure apparatus for introducing the foaming agent into the extruder. The process according to the present invention can be practiced in existing single and two-stage extruders following the modifications disclosed herein.

The present process comprises introducing a thermoplastic material into an inlet of an extruder having a length to diameter ratio of at least 30:1, said extruder comprising a screw having at least one stage; heating the thermoplastic material in a melt zone to a temperature sufficient to melt or soften the thermoplastic material to form a melted thermoplastic material; injecting an insoluble compressible, inert gas into the melted thermoplastic material at a position approximately 1 to 2 screw diameters downstream of the melt zone; mixing the molten thermoplastic material and the inert, compressible gas to form a homogeneous dispersion of insoluble bubbles within the material; reducing the pressure of the molten thermoplastic material causing the homogeneously dispersed bubbles to expand within the melted thermoplastic material to form a foamed article and cooling the foamed article to a temperature below the melting or softening point of the foamed article.

The successful extrusion of thermoplastic materials wherein an inert gas is introduced directly into the barrel of the extruder under relatively low pressure offers numerous advantages over conventional foaming processes. The process according to the present invention overcomes the problems previously associated with foaming thermoplastic materials wherein an inert gas was utilized. For example, U.S. Pat. No. 4,473.665 which discloses a method for preparing microcellular foamed materials wherein the material to be processed is presaturated with a uniform concentration of an soluble, inert gas, states at col. 2, lines 43-54 that the introduction of inert gas into the barrel of an extruder provides an unsatisfactory product because it is very difficult to measure the quantity of gas introduced into the process and the mixing stage of conventional extruders is not capable of dispersing and collapsing the large pockets of nitrogen gas within the polymer melt. The process according to the present invention is distinguished from prior art processes in that an inert gas, under low pressure, which is essentially insoluble in the thermoplastic material to be foamed, is injected into a novel and unobvious location within the extruder to create a microcellular foamed article.

The process according to the present invention provides for consistent foaming action which allows production of extruded parts having uniform size and uniform product cross-sectional consistency. Moreover, the use of the inert gases defined herein provide a safe, low cost alternative to the use of chlorofluorocarbons and hydrocarbon foaming agents which are believed to be damaging to the earth's environment.

The process according to the present invention comprises introducing a thermoplastic material into an inlet of an extruder having a length to diameter ratio of at least 30:1 wherein the extruder comprises a screw having at least one stage. Subject to the modifications defined herein, suitable extruders for practicing the present invention include conventional single stage and two stage extruders. Representative extruders are disclosed at pages 246–267 and 332–349 of the Modern Plastics Encyclopedia, 1982-83 published by the McGraw-Hill Publishing Company, the disclosure which is specifically incorporated by reference herein. More particularly, examples of extruders which are suitable for practicing the present invention, subject to the modification described herein, include the Welex "Super Twinch" 3.5"extruder manufactured by Welex Incorporated, 850 Jolly Road, Blue Bell, Pa, 19422 and the Farrel Extruder manufactured by Farrel Connecticut Division, Emhart Machinery Group Ansonia. Conn. 06401.

Thermoplastic materials capable of being foamed according to the present process include both amorphous and semi-crystalline polymers including the polymers of alpha-monoolefins having from 2 to about 8 carbon atoms including products formed by the polymerization of ethylene, propylene, 1-butene, 3-methyl-1-butene, 4-methyl-1-butene, 4-methyl-1-hexene and the like. Moreover, polymers and copolymers of vinylaromatics such as styrene and alpha-methylstyrene, including copolymers comprising non-aromatic monomers such as ABS (a terpolymer of styrene, acrylonitrile and butadiene) and SAN (a copolymer of styrene and acrylonitrile); acrylates such as methyl methacrylate, polyvinyl chloride and its modifications such as with polyvinyl acetate; polyvinylidene chloride and a variety of other polymers such as nylons, polycarbonates, polyesters, polyethers, cellulose derivatives and mixtures of such polymers with each other can be utilized. The polymers accordingly to the present invention are introduced into a single stage or two stage extruder at a feed rate ranging from about 100 to about 1000 pounds per hour.

The next step in the process comprises heating the thermoplastic material to a temperature sufficient to melt or soften the thermoplastic material to form a melted thermoplastic material. The melting or softening of the polymer is effected by the mixing action of the rotating screw within the extruder which is warmed by electrical heaters. Suitable temperature profiles for melting the thermoplastic material within the melt zone of the extruders are well known in the art.

The next step in the process comprises injecting a compressible, insoluble inert gas into the melted thermoplastic material at a position about 1 to 2 screw diameters downstream of the melting zone. The inert gas is injected into an injection port which comprises a tube or conduit of a specified diameter which has a sharp tipped opening. The diameter of the tube will vary depending upon the required gas flow. Typical tube diameters range from about one sixteenth to one-half inch. The location of the injection port is critical to the practice of the present invention. The pressure of the inert gas to be injected into the molten polymer must be about 100 psi above the extruder pressure at the location of injection into the extruder barrel. Injection can be accomplished without complex metering equipment. Suitable injection may be accomplished by using a pressure regulator, a flow control or check valve and a gas injector pressure tube.

The location of the injection port is not obvious in view of prior art processes wherein inert gases are utilized as foaming agents. The injection of inert gas into the extruder in prior art processes typically occurs immediately prior to the extruder die necessitating inert gas pressures ranging from about 8,000 to about 15,000 psi. The use of such high pressures causes the thermoplastic polymer to become supersaturated with the inert gas. In contrast to the prior art processes, the inert gases of the present invention are essentially insoluble in the melted thermoplastic material at the operating pressures defined herein. Typical inert gas pressures in the present process range from about 200 to about 2.500 psi. The polymer must be fully melted providing a melt seal between the gas injection inlet and the polymer feed inlet to prevent backflow of gases.

The term, inert gas, as used throughout the Specification and appended claims, is a gas which does not enter into a chemical reaction with the specific thermoplastic material used or with any additive or other ingredient used in the process according to the present invention. In other words, the term, inert gas, is not necessarily as broadly restrictive as it is generally understood. Thus, it may comprise, but does not necessarily comprise, an element of Group 0 of the Periodic Classification of the Chemical Elements according to Mendeleeff. Preferably, however, the inert gas is nitrogen, argon. xenon, krypton helium or carbon dioxide. Of these, nitrogen is particularly preferred as an inert foaming agent. The use of an inert gas ensures that undesirable side reactions which might interfere with the continuity of production can be avoided.

The next step in the process comprises mixing the molten thermoplastic material and the inert gas to form a homogeneous dispersion of insoluble bubbles of compressible inert gas within the thermoplastic material. This is accomplished through low shear mixing with standard flights, interrupted flights, mixing pins and the like. High shear mixing as accomplished with a Maddock mixer has proven to be unnecessary and in some cases can be detrimental causing pockets of unevenly foamed product due to overheating from the extreme shear forces. The extruder must have a length to diameter ratio of at least 30:1 to ensure that proper mixing occurs.

The final step in the process comprises cooling the foamed article to a temperature below the melting or softening temperature of the foamed article. Cooling is typically accomplished by subjecting the extruded foamed article to cooling water except in extrusion coating wherein the substrate acts as the cooler and in sheet extrusion wherein roll contact freezes the foamed extrudate. The foamed article may then be cut to length or rolled onto reels.

Various additives, coloring agents, lubricants and the like may be added to the thermoplastic material prior to foaming. For example, nucleating agents and surfactants can be added to the polymer prior to processing. Suitable nucleating agents include inorganic fillers such as talc, wollastonite, attapulgus clay, kaolin clay, calcium carbonate and the like as well as organic substances such as citric acid. Preferred nucleating agents include Teflon ® polytetrafluoroethylene powder and zeolite powders including zeolite 4A powder. Teflon powder is commercially available from Dupont De Nemours Corporation, Wilmington, Delaware and 4A zeolite is commercially available from Union Carbide Corporation. Tarrytown, New York. Activators can also be added to increase the gas yield at lower processing temperatures. Suitable activators may include zinc oxide, acids, gases, peroxides, other foaming agents, and zinc-, barium- or cadmium- based vinyl stabilizers.

The amount of foaming agent to be used in the present process depends on the desired expansion ratio and the particular polymer contemplated for foaming. Generally, the amount of foaming agent to be utilized ranges between about 1 and 20 or more volumes of inert gas per volume of thermoplastic material. The particular amount of foaming agent to be used is easily determined by those skilled in the art and should be that amount sufficient to produce the desired expansion ratio. In the event that the desired expansion ratio cannot be obtained due to limitations imposed by the particular system (i.e., if the allowable processing temperature range limits the expansion rate) then physical and chemical foaming agents can be used in conjunction with the inert gases of the present invention. Suitable conventional foaming agents which may be utilized in conjunction with the inert gases include trichlorofluoromethane, butane, azodicarbonamide, azobisisobutyronitrile, dinitrosopentamethylenetetramine and the like.

The driving force for expansion is the pressure difference between the higher pressure within the apparatus and the lower ambient pressure wherein such a pressure difference allows the inert gas to expand thereby forming an essentially homogeneous dispersion of gas inclusions within the melted thermoplastic material to be foamed. The expansion according to the present invention can be adapted readily for use in processes utilizing injection molding, compression molding and the like.

The process according to the present invention is discussed in greater detail with reference to the sole Figure which depicts a single stage extruder suitable for practicing the present invention. The process according to the present invention may also be practiced using a 2-stage extruder wherein the screw configuration depicted in the Figure is repeated to provide maximum mixing of the thermoplastic material and foaming agent as well as improved regulation of pressure. One of ordinary skill in the art can readily ascertain the required design and operation of a 2-stage exduter upon reading the teachings disclosed in this Specification and the Figure.

The Figure presents a single stage extruder comprising a long cylindrical barrel 1, screw 2 having a length to diameter ratio of at least 30:1 which rotates within barrel 1, heating bands 3, feed hopper 4, breaker plate 5 and die 6. More particularly, screw 2 is a close-fitting screwlike part which rotates within barrel 1 conveying the thermoplastic material to be foamed forward through each successive flight. Screw 2 is caused to rotate via operation of motor 7 which is connected to a reducer drive 9 via drive system 8. Rotational speeds of up to 200 rpm are possible but typical rotational speeds are about 100 rpm. The extruder is equipped with electrical heating bands 3 which supply heat to the thermoplastic material being processed. Screw 2 is segregated into three distinct zones, namely, melt zone 10, transition zone 11 and metering zone 12.

Pellets of thermoplastic material as well as any desired additives are introduced into melt zone 10 via feed hopper 4. Melt zone 10 comprises approximately half of the length of the screw. The thermoplastic material is conveyed forward by the screw wherein the material adsorbs heat and melts or softens. The melted thermoplastic material is then conveyed into transition zone 11 wherein a compressible, inert gas is introduced into the molten thermoplastic material via conduit 13 at a location about one to two screw diameters downstream of the melt zone.

The molten thermoplastic material and the inert gas are mixed and further compressed as a consequence of the reduced volume within each successive flight of the screw. The inert gas is introduced into the transition zone under a pressure of about 200 to about 2500 psi at which pressure the inert gas is essentially insoluble in the thermoplastic material. The compressed molten thermoplastic material and the inert gas are then transferred into metering zone 12 wherein further mixing and compression causes the insoluble bubbles of inert gas to be essentially homogeneously dispersed within the molten thermoplastic material. The rotating action of screw 2 causes the thermoplastic material to be transferred under pressure through die 6 wherein the molten thermoplastic material containing the homogeneously dispersed bubbles of inert gas is expanded as the thermoplastic material, residing at a higher temperature and pressure, passes through die 6 to the outside of the die which typically resides at ambient pressure and temperature. The resultant foamed article is then cooled via contact with water (not shown). The process depicted in the Figure may be adapted by those skilled in the art to produce a wide range of foamed articles including cable, wire sheet, profile, piping and the like.

The introduction of an insoluble, compressible inert gas into a thermoplastic material typically causes the melt viscosity of the polymer to change resulting in a downward shift in the melt viscosity vs. temperature profile. Therefore, it must be recognized that the extruder temperature profile utilized in foaming a particular thermoplastic material according to the present process will vary somewhat from the temperature profile used to foam such a thermoplastic material using liquid foaming agents such as chlorofluorocarbons which are soluble in the thermoplastic material.

When the thermoplastic material to be foamed and the compressible inert gas are properly mixed to provide a homogeneous dispersion of bubbles within the thermoplastic material, it has been noted that the gas/thermoplastic polymer mix typically exhibits reduced lubricity. Addition of a lubricant into the thermoplastic material and use of a pressure die can be utilized to compensate for such a decrease in lubricity when precise dimensional control is required. Typical lubricants known in the art can be utilized.

The following examples illustrate the nature of the process described herein and are not intended to limit the scope of the claimed invention. Unless otherwise stated, parts and percentages in the examples are given by weight.

EXAMPLE 1

PREPARATION OF POLYETHYLENE FOAM

Polyethylene pellets, (80% high density/20% low density) purchased from Dow Chemical Corporation, Midland. Michigan, were melted processed in a Killion extruder (3 inch diameter, L/D=30:1) utilizing an essentially uniform rate of approximately 300 lbs/hr. The polyethylene pellets were melted in a melt zone having a length to diameter ratio of 15:1 with respect to the overall length of the screw and the melt zone was maintained at a temperature profile between about 380° and 430° F. Nitrogen gas was introduced into the extruder barrel at a pressure of approximately 1300 psi at a location two screw diameters downstream of the melt zone via a septum connected to a nitrogen cylinder (2600 psi) equipped with a regulator. The injector was situated flush to the internal diameter of the screw barrel and the screw at this position was equipped with simple flights. The temperature profile within the metering zone was maintained between about 300° to 340° F. The molten material containing insoluble bubbles of inert gas was then passed through a pressure die maintained at a temperature between 240° to 300° F. The resultant foamed material was cooled via contact with water in a trough. The foamed material had a specific gravity of 0.3329 gm/cc and was overblown and of poor quality.

EXAMPLE 2

PREPARATION OF POLYETHYLENE FOAM (COMPARATIVE EXAMPLE)

In a procedure similar to Example 1, polyethylene pellets were processed with the exception that nitrogen gas was introduced into the extruder barrel at a pressure of approximately 1300 psi at a location approximately 26 diameters downstream of the feed hopper inlet. No foamed material was produced as the thermoplastic material merely blistered.

EXAMPLE 3

PREPARATION OF POLYETHYLENE FOAM (COMPARATIVE EXAMPLE)

In a procedure similar to Example 1, polyethylene pellets were processed with the exception that nitrogen gas was introduced into the extruder barrel in the melt zone at a location approximately 13 diameters downstream of the feed hopper inlet. No foamed material was produced because the nitrogen gas blew out of the extruder by way of the feed hopper.

EXAMPLE 4

PREPARATION OF POLYETHYLENE FOAM

Polyethylene pellets were processed according to the procedure in Example 1 wherein the polyethylene pellets were dry blended with various nucleating agents according to the ratios provided in the Table.

The Table discloses the expansion ratios and foam quality achieved by utilizing the process according to the present invention in conjunction with various nucleating agents.

TABLE 1

| Run | Example | Foaming Agent | Wt/% | Density (g/cc) | Foam Quality |
|---|---|---|---|---|---|
| 1 | 4-1 | Henley[1] | 1.0 | 0.282 | Good |
| 2 | 4-2 | Henley | 1.0 | 0.299 | Good |
|   |     | 4A zeolite | 0.5 |       |      |
| 3 | 4-3 | Teflon ® | 0.3 | 0.266 | Excellent |
| 4 | 4-4 | Teflon ® | 0.4 | 0.280 | Excellent |
| 5 | 4-5 | 4A zeolite | 0.5 | 0.280 | Excellent |
| 6 | 4-6 | 4A zeolite | 0.66 | 0.280 | Excellent |
| 7 | 4-7 | Mistron ZSC[2] | 1.0 | 0.295 | Poor |
| 8 | 4-8 | Mistron Vapor[3] | 1.0 | 0.286 | Overblown |
| 9 | 4-9 | Azodicarbonamide | 0.2 | 0.428 | Overblown |
| 10 | 4-10 | Azodicarbonamide | 0.026 | 0.486 | Good |

[1]Henley TAF-05-4, a mixture of 0.25 wt % citric acid, 0.025 wt % sodium bicarbonate and about 99 wt % talc, is commercially available from Henley & Co., Elk Grove Village, Illinois.
[2]Mistron ZSC is talc coated with zinc stearate and is commercially available from Crypres Minerals Inc., Englewood Colorado.
[3]Mistron Vapor is talc and is commercially available from Crypres Minerals Inc., Englewood Colorado.

The Table illustrates that addition of a small amount of nucleating agent into the thermoplastic material prior to extrusion provides foamed materials of varying densities. Runs 3 through 6 demonstrate that polyethylene (80% high density/20% low density) foam having excellent quality can be produced wherein Teflon powder and 4A zeolite are utilized as nucleating agents. While the foams produced in Runs 8 and 9 were overblown, high quality foams are believed to be obtainable upon reducing the volume of inert gas and/or the amount of nucleating agent used. The data demonstrate that the process according to the present invention wherein low pressure nitrogen is utilized effectively produces foamed thermoplastic articles.

Various other embodiments and aspects of the present invention will occur to those skilled in the art without departing from the spirit or scope of the invention. Having thus described the present invention, what is now deemed appropriate for Letters patent is set out in the following appended claims.

What is claimed is:

1. A process for producing a closed cell microcellular foamed article from a thermoplastic material comprising:
   a) introducing a thermoplastic material into an inlet of an extruder having a length to diameter ratio of at least 30:1, the extruder comprising a screw having at least one stage;
   b) heating the thermoplastic material in a melt zone to a temperature sufficient to melt or soften the thermoplastic material to form a melted thermoplastic material;
   c) injecting an insoluble compressible inert gas at a pressure ranging from 200 to 2,500 psi into the melted thermoplastic material at a position about 1 to 2 screw diameters downstream of the melt zone;
   d) mixing the molten thermoplastic material and the compressible, inert gas to form a homogeneous dispersion of insoluble bubbles within the material;
   e) reducing the pressure of the molten thermoplastic material causing the homogeneously dispersed bubbles to expand within the melted thermoplastic material to form a microcellular foamed article and
   f) cooling the foamed article to a temperature below the melting or softening point of the foamed article.

2. The process according to claim 1 wherein the extruder has a single stage.

3. The process according to claim 1 wherein the extruder has two stages.

4. The process according to claim 1 wherein the thermoplastic material is selected from the group consisting of polymers formed by polymerization of an olefin having from 2 to about 8 carbon atoms.

5. The process according to claim 4 wherein the olefin is selected from the group consisting of ethylene, propylene, 1-butene, 3-methyl-1-butene, 4-methyl-1-butene and 4-methyl-1-hexene.

6. The process according to claim 1 wherein the thermoplastic material is polyethylene.

7. The process according to claim 1 wherein the thermoplastic material is polypropylene.

8. The process according to claim 1 wherein the insoluble compressible inert gas is selected from the group consisting of nitrogen, argon, xenon, krypton, helium and carbon dioxide.

9. The process according to claim 1 wherein the insoluble compressible inert gas is nitrogen.

10. A process for producing a closed cell microcellular foamed article from a thermoplastic material comprising:
   (a) introducing a thermoplastic material containing at least one nucleating agent into an inlet of an extruder having a length to diameter ratio of at least 30:1, the extruder comprising a screw having at least one stage;

(b) heating the thermoplastic material in a melt zone to a temperature sufficient to melt or soften the thermoplastic material to from a melted thermoplastic material;

(c) injecting an insoluble compressible inert gas at a pressure ranging from 200 to about 2,500 psig into the melted thermoplastic material at a position about 1 to 2 screw diameters downstream of the melt zone;

(d) mixing the molten thermoplastic material and the compressible, inert gas to form a homogeneous dispersion of insoluble bubbles within the material;

(e) reducing the pressure of the molten thermoplastic material causing the homogeneously dispersed bubbles to expand with the melted thermoplastic material to form a microcellular foamed article and (f) cooling the foamed article to a temperature below the melting or softening point of the foamed article.

11. The process according to claim 10 wherein the thermoplastic material is selected from the group consisting of polymers formed by polymerization of an olefin having from 2 to about 8 carbon atoms.

12. The process according to claim 11 wherein the olefin is selected from the group consisting of ethylene, propylene, 1-butene, 3-methyl-1-butene, 4-methyl-1-butene and 4-methyl-1-hexene.

13. The process according to claim 11 wherein the thermoplastic material is polyethylene.

14. The process according to claim 11 wherein the thermoplastic material is polypropylene.

15. The process according to claim 10 wherein the nucleating agent is selected from the group consisting of talc, wollastonite, attapulgus clay, kaolin clay, calcium carbonate, citric acid, polytetrafluoroethylene powder and zeolite powders.

16. The process according to claim 15 wherein the nucleating agent is zeolite 4A powder.

17. The process according to claim 10 wherein the nucleating agent is polytetrafluoroethylene powder.

18. The process according to claim 10 wherein the insoluble compressible inert gas is selected from the group consisting of nitrogen, argon, xenon, krypton, helium and carbon dioxide.

19. The process according to claim 10 wherein the insoluble compressible inert gas is nitrogen.

* * * * *

UNITED STATES PATENT AND TRADEMARK OFFICE
CERTIFICATE OF CORRECTION

PATENT NO. : 5,034,171

DATED : July 23, 1991

INVENTOR(S) : Kiczek et al.

It is certified that error appears in the above-identified patent and that said Letters Patent is hereby corrected as shown below:

Column 1, line 41, delete the space after "semi-carbazides)" and before the ".".

Column 2, line 21, "15.000" should be -- 15,000 --.

Column 2, line 36, "4,473.665" should be -- 4,473,665 --.

Column 3, line 37, "alpha-methylstyrene. including" should be -- alpha-methylstyrene, including --.

Column 3, line 44, "such as nylons. polycarbonates, polyesters. polyethers," should be -- such as nylons, polycarbonates, polyesters, polyethers, --.

Column 4, line 36, "4,473.665" should be -- 4,473,665 --.

Column 5, line 11, "Emhart Machinery Group Ansonia. Conn. 06401." should be -- Emhart Machinery Group, Ansonia, Conn. 06401. --.

Column 6, line 5, "2.500" should be -- 2,500 --.

Column 6, line 19, "argon. xenon," should be -- argon, xenon --.

Column 6, line 60, "Corporation. Tarrytown," should be -- Corporation, Tarrytown, --.

UNITED STATES PATENT AND TRADEMARK OFFICE
CERTIFICATE OF CORRECTION

PATENT NO. : 5,034,171                              Page 2 of 2
DATED      : July 23, 1991
INVENTOR(S): Edward F. Kiczek, et al.

It is certified that error appears in the above-identified patent and that said Letters Patent is hereby corrected as shown below:

Column 8, line 20, "wire sheet" should be -- wire, sheet --.

Column 8, line 53, "Midland. Michigan," should be -- Midland, Michigan, --.

Column 11, line 5 "from" should be -- form --.

Signed and Sealed this

Second Day of March, 1993

Attest:

STEPHEN G. KUNIN

Attesting Officer          Acting Commissioner of Patents and Trademarks